United States Patent
Vissa et al.

(10) Patent No.: US 10,433,118 B1
(45) Date of Patent: *Oct. 1, 2019

(54) NAVIGATION TRACKING IN AN ALWAYS AWARE LOCATION ENVIRONMENT WITH MOBILE LOCALIZATION NODES

(71) Applicant: Motorola Mobility LLC, Chicago, IL (US)

(72) Inventors: Sudhir C. Vissa, Bensenville, IL (US); Joseph Vincent Nasti, Chicago, IL (US); Vivek Kumar Tyagi, Chicago, IL (US); Douglas Alfred Lautner, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,408

(22) Filed: Feb. 14, 2019

Related U.S. Application Data

(63) Continuation of application No. 15/941,950, filed on Mar. 30, 2018.

(51) Int. Cl.
*H04W 4/029* (2018.01)
*H04W 4/021* (2018.01)
*G01S 11/08* (2006.01)

(52) U.S. Cl.
CPC ............ *H04W 4/029* (2018.02); *G01S 11/08* (2013.01); *H04W 4/021* (2013.01)

(58) Field of Classification Search
CPC . H04L 67/18; H04L 12/2818; H04L 12/2825; H04L 12/2827; H04L 2209/608; H04W 4/02; H04W 4/021; H04W 4/029; H04W 4/04; H04W 4/21; H04W 4/38; H04W 4/023; H04W 64/00; H04W 76/11; G06Q 20/3224; G06Q 50/01;
(Continued)

(56) References Cited

U.S. PATENT DOCUMENTS 10,285,017 B1   5/2019   Vissa et al.
2015/0330805 A1   11/2015   Cho et al.
2016/0157165 A1   6/2016   Xie et al.

OTHER PUBLICATIONS

"Non-Final Office Action", U.S. Appl. No. 15/941,950, dated Aug. 10, 2018, 17 pages.
(Continued)

*Primary Examiner* — Nizar N Sivji
(74) *Attorney, Agent, or Firm* — SBMC

(57) ABSTRACT

In aspects of navigation tracking in an always aware location environment with mobile localization nodes, a positioning system includes a server computing device that can locate wireless communication devices in an always aware location (AAL) environment. A mobile localization node located within the AAL environment implements a positioning module to receive, from the server computing device, one or two initial coordinates of the mobile localization node at a current location in the AAL environment. The positioning module can determine one or more additional coordinates of the mobile localization node at the current location in the AAL environment, and designate the current location as an origin of the mobile localization node based on a combination of the initial and additional coordinates. The positioning module can then self-track navigation of the mobile localization node within the AAL environment as the mobile localization node moves from the origin to subsequent locations.

20 Claims, 5 Drawing Sheets

(58) Field of Classification Search
CPC .............. G06Q 30/0205; G06Q 50/28; G05D 2201/0216; G05D 1/0225; G05D 1/0238; G05D 1/0251; G05D 1/028; G06F 17/30041; G01C 21/20; G01C 21/206; G06K 2017/0045; G08C 2201/32; G08C 2201/71; G08C 2201/91; G01S 5/0252; G01S 19/13; G01S 5/02; G01S 5/0205; G01S 5/0284; G01S 5/0294; G01S 1/68; G01S 1/70; G01S 1/72; G01S 5/0236; G01S 5/0242; G01S 5/0263; G02B 27/0179

See application file for complete search history.

(56) References Cited

OTHER PUBLICATIONS

"Notice of Allowance", U.S. Appl. No. 15/941,950, dated Feb. 1, 2019, 5 pages.
"Notice of Allowance", U.S. Appl. No. 15/941,950, dated Jan. 17, 2019, 7 pages.

400

Receive at least one initial coordinate from a server computing device that implements a location module to locate wireless communication devices in an always aware location (AAL) environment
402

Determine one or more additional coordinates of a mobile localization node in the AAL environment
404

Correlate the at least one initial coordinate received from the server computing device with the one or more additional coordinates determined by the positioning module based on a common timestamp for the initial and additional coordinates
406

Designate an origin of the mobile localization node within the AAL environment based on a combination of the correlated coordinates
408

Self-track navigation of the mobile localization node in three dimensions based on updates to the correlated coordinates as the mobile localization node moves from the origin to subsequent locations within the AAL environment
410

Receive a request from the server computing device for a current position of the mobile localization node
412

Communicate the current position of the mobile localization node based on current location coordinates of the mobile localization node in the AAL environment
414

Generate a three-dimensional (3D) mesh that visually represents one or more of the subsequent locations of the mobile localization node in the AAL environment
416

*FIG. 4*

025# NAVIGATION TRACKING IN AN ALWAYS AWARE LOCATION ENVIRONMENT WITH MOBILE LOCALIZATION NODES

RELATED APPLICATION

This application is a continuation of and claims priority to U.S. patent application Ser. No. 15/941,950 filed Mar. 30, 2018 entitled "Navigation Tracking in an Always Aware Location Environment with Mobile Localization Nodes," the disclosure of which is incorporated by reference herein in its entirety.

BACKGROUND

Generally, a geo-fenced area can be established as a virtual perimeter around a boundary of any structure or environment, such as a building, an area of a building, a retail store, a warehouse, an airport terminal, a parking lot, an outdoor region, or other type of designated area. For example, an indoor positioning system for a geo-fenced area can be established with a server computing device and wireless devices, commonly referred to as the system anchors that establish the boundary edges of the indoor positioning system. The anchor devices communicate two-dimensional, x,y-coordinates position location information to the server computing device, where the x,y-coordinates are relative to a horizontal plane of the geo-fenced area. The server computing device and/or the anchor devices can also communicate with mobile devices and wireless tags for two-dimensional device tracking within the geo-fenced area.

For example, a user may carry an object that is trackable with a wireless tag and/or carry a mobile device into the geo-fenced area, and the various devices may be implemented to communicate in the geo-fenced area using various wireless communication technologies, such as ultra-wideband (UWB), Near Field Communication (NFC), Radio-frequency identification (RFID), Real-time Locating System (RTLS), Bluetooth™, and/or Bluetooth Low Energy (BLE). However, the wireless communications between the geo-fenced area devices and a wireless tag or a mobile device that enters and moves about within the geo-fenced area can be delayed due to communication latencies, as well as being limited by the excessive power drain on the wireless tag or mobile device by the constant radio systems communication and positioning updates.

BRIEF DESCRIPTION OF THE DRAWINGS

Aspects of navigation tracking in an always aware location environment with mobile localization nodes are described with reference to the following Figures. The same numbers may be used throughout to reference like features and components that are shown in the Figures:

FIG. 4 illustrates example method(s) of navigation tracking in an always aware location environment with mobile localization nodes in accordance with techniques described herein.

DETAILED DESCRIPTION

Figure 1:
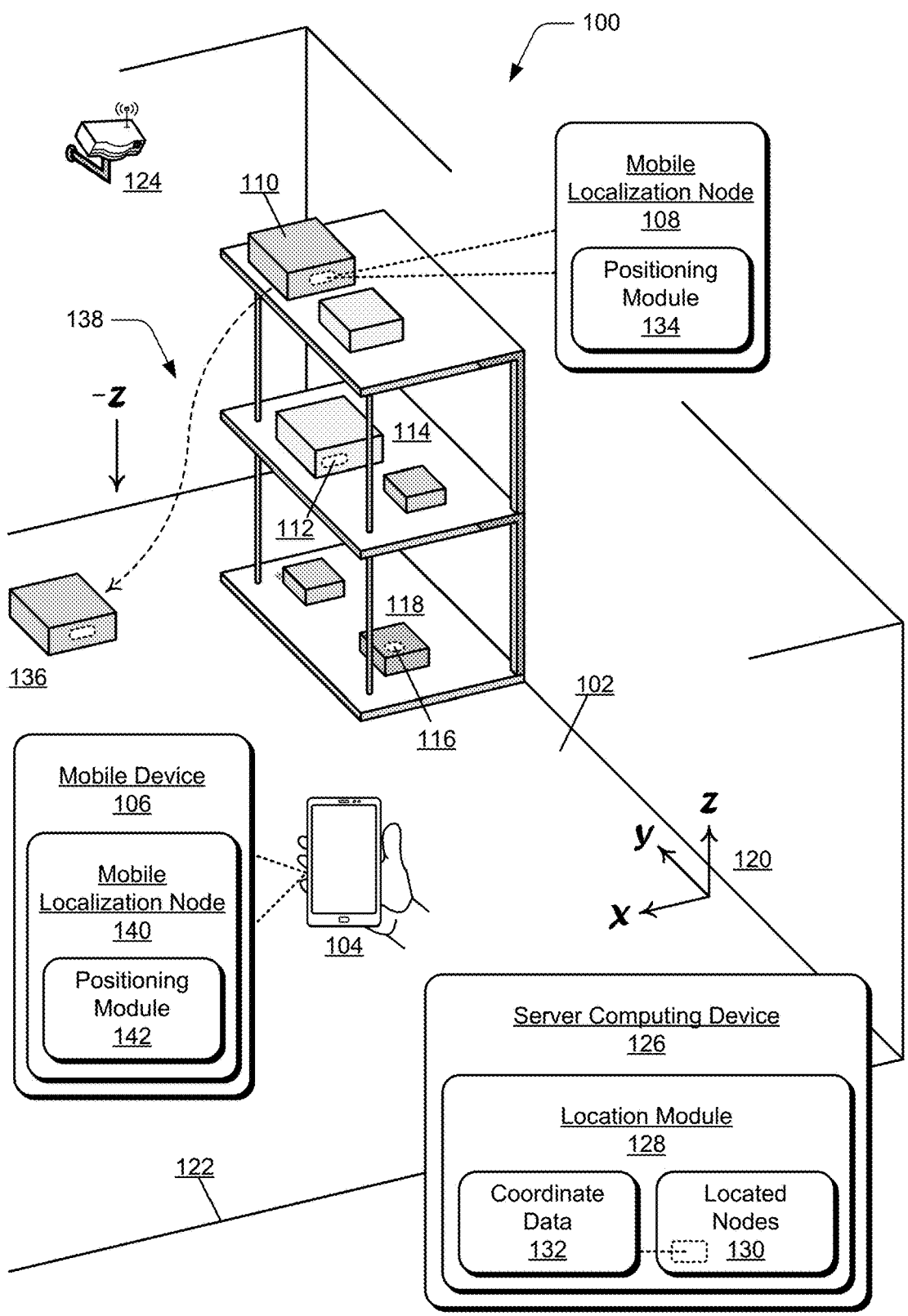
FIG. 1 illustrates an example environment in which aspects of navigation tracking in an always aware location environment with mobile localization nodes can be implemented.

Navigation tracking in an always aware location environment with mobile localization nodes is described, and can be implemented to track objects and items in three dimensions as location coordinates in an "always aware location" (AAL) environment, such as in a geo-fenced area. Aspects of the navigation tracking can be implemented in the context of the AAL environment, such as for any type of inventory tracking, item location, item recovery, and deriving location context of items and objects in the environment. Mobile localization nodes (also referred to as mobile sensors) are generally small electronic tags or labels that can be utilized to process and/or store data and other information, and can be associated with any type of an object or item, such as by being placed in or affixed to an object for inventory tracking and item location detection. The mobile localization nodes can be utilized in a retail store or warehouse environment that has been established as an AAL environment (e.g., a geo-fenced area) having any number of inventoried items, objects, and/or products for storage or purchase, each of which can be identified and tracked with a mobile localization node. The mobile localization nodes may also be used in a person's home when established as an AAL environment to locate and track items, such as to find one's keys, wallet, or mobile phone that has been misplaced in the environment. Generally, as a geo-fenced area or other designated area, an AAL environment can be established as a virtual perimeter in or around a boundary of any structure or environment.

In aspects of navigation tracking in an always aware location environment with mobile localization nodes, a mobile localization node that corresponds to an item or object in an AAL environment is implemented with a positioning module, which is designed to self-track the navigation (e.g., movement and locations) of the mobile localization node within the AAL environment based on data received from an inertial measurement unit of the mobile localization node. Rather than conventional systems that track devices in just two-dimensional x,y-coordinates, the features of navigation tracking in an always aware location environment with mobile localization nodes can be implemented to track objects and items in three dimensions as x,y,z-coordinates in an AAL environment. Further, the self-tracking features of the mobile localization nodes implemented for the navigation tracking do not suffer from the communication latencies that are common with device tracking, and are not limited by the typical excessive power drain that occurs with typical wireless tags or mobile devices by the constant radio systems communication and positioning updates to track the two-dimensional x,y-coordinates position locations.

Generally, an AAL environment, such as a geo-fenced area, is facilitated by a server computing device that manages wireless communications and tracking updates in the environment, and the server computing device implements a location module that is designed to detect and track mobile sensors and mobile devices in one or two dimensions in the AAL environment, such as designated by x-coordinates or x,y-coordinates relative to a horizontal plane of the environment. The positioning module of a mobile localization node in the AAL environment can initially receive the x-coordinate data or the x,y-coordinate data corresponding to the mobile localization node from the server computing device. The positioning module of the mobile localization node can then determine (or has previously determined) one or more additional coordinates, such as a z-coordinate, of the mobile localization node in the AAL environment, such as from the inertial measurement unit of the mobile localization node. The positioning module can then correlate the initial x-coordinate data or the x,y-coordinates data received from the server computing device with the one or more additional coordinates (e.g., the z-elevation data) determined by the positioning module for the mobile localization node, such as based on a common timestamp for the initial and additional coordinates (e.g., x,y,z-coordinates).

The positioning module of the mobile localization node can designate a device origin of the mobile localization node within the AAL environment based on a combination of the coordinates (e.g., the x,y,z-coordinates) that have been correlated and correspond to the location of the mobile localization node in the AAL environment. The device origin can be set at (0,0,0), or any other coordinates relative to the location or position of the mobile localization node in the AAL environment. Initially, the sensors of the inertial measurement unit do not have a frame of reference to know where the mobile localization node is located in the environment. However, the correlation of the x,y,z-coordinates provides a dead-reckoning from which to track the navigation of the mobile localization node in the AAL environment, such as based on data received from the inertial measurement unit of the mobile localization node. The data received from the inertial measurement unit can be in the form of rotational vectors from the sensors of the inertial measurement unit. In implementations, the coordinate tracking data received from the inertial measurement unit can be augmented by accelerometer data, such as to infer z-elevation data, and may be augmented with orientation data in the form of pitch, yaw, and/or roll. Other sensor and location data may be received from a barometer sensor, a camera, and other sensors from which dimension, rotation, navigation, and location coordinates can be determined.

The positioning module is implemented to then self-track navigation of the mobile localization node in the AAL environment in three dimensions based on updates to the x,y,z-coordinates as the mobile sensor moves (or is moved with an associated item) from the designated origin to subsequent locations within the AAL environment. Notably, the self-tracking navigation of the mobile localization node by the positioning module is implemented without communication to the server computing device, and without receiving updated location coordinate data from the server computing device.

While features and concepts of navigation tracking in an always aware location environment with mobile localization nodes can be implemented in any number of different devices, systems, environments, and/or configurations, aspects of navigation tracking in an always aware location environment with mobile localization nodes are described in the context of the following example devices, systems, and methods.

FIG. 1 illustrates an example environment 100 in which aspects of navigation tracking in an always aware location environment with mobile localization nodes can be implemented. The example environment 100 is representative of any indoor or outdoor region or environment that is established as an always aware location (AAL) environment 102, such as a geo-fenced area in a building, an area of a building, a warehouse, an airport terminal, a parking lot, an outdoor region, or other type of designated area or environment. An AAL environment designated by a geo-fenced area is generally established as a virtual perimeter around a boundary of any structure or environment, and in this example, the AAL environment 102 is a virtual perimeter within the boundaries of a building, such as a warehouse or retail store, in which objects are stored and/or displayed. Generally, the AAL environment 102 is established as a two-dimensional area based on x,y-coordinates relative to a horizontal plane of the environment.

A person may enter the building (and into the AAL environment 102), such as any type of retail store that a person may enter looking for an item to purchase, a warehouse that a person may enter looking for a stocked item, a library where a person may browse magazines and borrow reading material, or any other type of environment that a person might visit while carrying a mobile phone 104. Aspects of navigation tracking in an always aware location environment with mobile localization nodes may also be implemented in a person's home to locate and track items, such as to find one's keys, wallet, or mobile phone that has been misplaced in an "always aware location" (AAL) system.

In the example AAL environment 102, the mobile phone 104 is an example of any type of mobile device 106, such as a tablet device, a wearable device or wearable article, or a mobile phone. Generally, the mobile device 106 is any type of an electronic and/or computing device implemented with various components, such as a processing system and memory, as well as any number and combination of different components as further described with reference to the example device shown in FIG. 5. Details of the mobile device 106 are further shown and described with reference to FIG. 2 that illustrates an example 200 of the mobile device 106 in context of the example environment 100. The terms "person" and "user" are generally used herein interchangeably, where a person with the mobile phone 104 is also the user of the mobile phone in the environment of the AAL environment 102.

As a retail store or warehouse, the AAL environment 102 can include any number of inventoried items, objects, and/or products for storage or purchase, each of which can be identified and tracked with a mobile localization node 108. Generally, a mobile localization node is a small electronic tag or label that can process and/or store data and other information in memory on the mobile localization node, and the mobile localization node 108 can be associated with any type of object or item, such as by being placed in or affixed to an object for inventory tracking, item location, item recovery, and the like. In this example, the mobile localization node 108 is associated with (e.g., is attached to) an item 110 that is located in the AAL environment 102 on a top shelf of a shelving unit. Similarly, a mobile localization node 112 is associated with an item 114 that is located in the AAL environment 102 on a middle shelf of the shelving unit, and a mobile localization node 116 is associated with an item 118 that is located in the AAL environment 102 on a bottom shelf of the shelving unit. As will be described in more detail, each of the items in the AAL environment can be located and/or tracked based on x,y,z-coordinates 120 within the boundaries 122 of the environment.

Generally, the mobile localization nodes, such as the mobile localization node 108, can be implemented as any type of an electronic and/or computing device implemented with various components, such as a processing system and memory, as well as any number and combination of different components as further described with reference to the example device shown in FIG. 5. Details of the mobile localization node 108 are further shown and described with reference to FIG. 2 that illustrates an example 200 of the mobile localization node 108 in context of the example environment 100. The mobile localization node 108 can include a memory that stores identifying data of the item 110 that the mobile localization node is associated with, as well as a unique identifier of the particular mobile localization node 108 and may include any other type of metadata, such as location data that indicates a location or region of the item 110 in the AAL environment 102.

Additionally, the mobile localization nodes may be implemented as any type of wireless-radio based tags for various different radio-based, wireless signaling, such as with LTE, Near Field Communication (NFC), Real-time Locating System (RTLS), radio frequency identification (RFID), Bluetooth™ devices, and the like. In this example, the AAL environment 102 may also include Internet-of-things (IoT) network devices, Wi-Fi connected devices 124, and/or additional mobile devices. The IoT devices in the AAL environment 102 may also include motion sensors, surveillance cameras, monitoring devices, control devices, and any other type of networked computing and/or electronic devices that wirelessly communicate in the AAL environment 102.

In this example, the AAL environment 102 includes a server computing device 126 that facilitates setup and wireless communications in the environment. The server computing device 126 implements a location module 128, which may include independent processing, memory, and logic components functioning as a computing and/or electronic device integrated with the server computing device 126. Alternatively or in addition, the location module 128 can be implemented as a software application or software module, such as computer-executable software instructions that are executable with a processor or processing system of the server computing device. As a software application, the location module 128 can be stored on computer-readable storage memory, or with any suitable memory device or electronic data storage implemented with the server computing device. In implementations, the server computing device 126 may be part of a business server system that is associated with the building, warehouse, retail store, or other environment for which the AAL environment 102 is established.

The mobile phone 104, other mobile devices 106, and mobile localization nodes 108 that are carried into or placed in the AAL environment 102 may be registered as devices for communication with the server computing device 126 of a business server system. Alternatively, the mobile phone 104, other mobile devices 106, and mobile localization nodes 108 may be previously registered for communication between the devices and with the server computing device 126, such as via the Wi-Fi connected device 124 in the environment of the AAL environment 102. Further, the mobile phone 104, other mobile devices 106, mobile localization nodes 108, and other types of wireless communication devices may be setup to self-detect entry into the AAL environment 102. Alternatively or in addition, the location module 128 of the server computing device 126 can detect entry of the mobile phone 104, other mobile devices 106, and mobile localization nodes 108 into the environment.

Generally, the location module 128 is implemented to locate and track the wireless communication devices in one-dimension or two-dimensions in the AAL environment 102, which is designated by the coordinates 120 relative to a horizontal plane of the environment. As used herein, the term "localization nodes" that are located in the AAL environment 102 include any of the mobile phone 104, other mobile devices 106, the mobile localization nodes 108, and any other wireless communication devices, wireless-radio based tags, sensors, and/or devices that include or implement wireless-radio based tags or sensors. The location module 128 can track the located nodes 130 and communicate coordinate data 132 to the located nodes 130, which in this example, includes the mobile phone 104, other mobile devices 106, and the mobile localization node 108 in the AAL environment 102.

Figure 2:
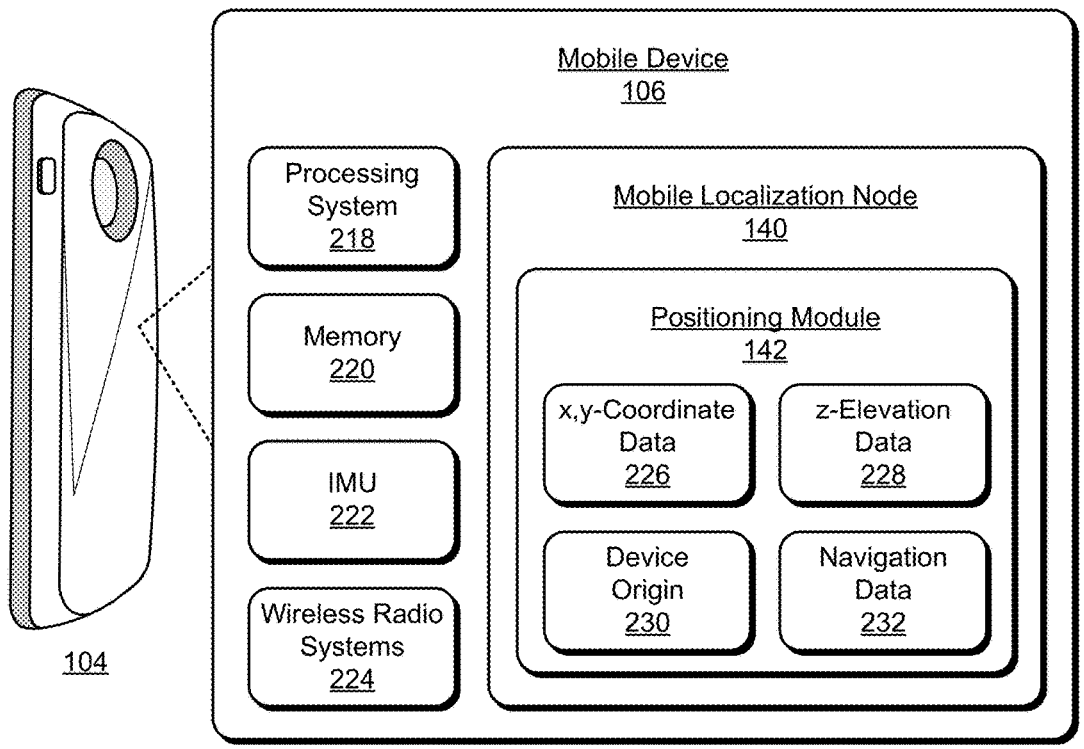
FIG. 2 further illustrates an example mobile sensor and mobile device implemented in the example environment in which aspects of navigation tracking in an always aware location environment with mobile localization nodes can be implemented.

The mobile localization node 108 includes a positioning module 134 that implements aspects of navigation tracking in an always aware location environment with mobile localization nodes. With reference to FIG. 2, the positioning module 134 may include independent processing, memory, and logic components functioning as a computing and/or electronic device integrated with the mobile localization node 108. Alternatively or in addition, the positioning module 134 can be implemented as a software application or software module, such as computer-executable software instructions that are executable with a processor or processing system 202 of the mobile localization node 108. As a software application, the positioning module 134 can be stored on computer-readable storage memory (e.g., device memory 204), or with any suitable memory device or electronic data storage implemented with the mobile localization node 108.

In this example, the mobile localization node 108 includes an inertial measurement unit 206, which may include various sensors, such as a gyroscope, an accelerometer, and/or other types of motion sensors to sense motion and movement of the mobile localization node 108. The various sensors of the inertial measurement unit 206 generate sensor data vectors having three-dimensional parameters (e.g., rotational vectors in x, y, and z coordinates) indicating position, location, and/or orientation of the mobile localization node 108. As described in more detail below, the positioning module 134 of the mobile localization node 108 is implemented to self-track the navigation of the mobile localization node 108 within the AAL environment 102 based on data received from the inertial measurement unit 206 of the mobile localization node. The data received from the inertial measurement unit can be in the form of rotational vector data in three dimensions from the sensors of the inertial measurement unit. In implementations, the coordinate tracking data received from the inertial measurement unit 206 can be augmented by accelerometer data, such as to infer z-elevation data, and may be augmented with orientation data in the form of pitch, yaw, and/or roll. Other sensor and location data may be received from a barometer sensor, a camera, and other sensors from which dimension, rotation, navigation, and location coordinates can be determined.

The mobile localization node 108 can also include one or more different wireless radio systems 208, such as for Wi-Fi, Bluetooth™, Mobile Broadband, LTE, Near Field Communication (NFC), Real-time Locating System (RTLS), or any other wireless radio system or format for communication via respective wireless networks. Generally, the mobile localization node 108 implements the wireless radio systems 208 that each include a radio device, antenna, and chipset implemented for cellular, wireless, and/or other network communication with other devices, networks, and services. A wireless radio system 208 can be configured to implement any suitable communication protocol or standard.

Any of the server, computing, and/or mobile devices, as well as the mobile localization nodes, described herein can communicate via any type of communication and data network (or combination of networks), such as for data communication between the mobile phone 104, the mobile localization node 108, the Wi-Fi connected device 124, the server computing device 126 of the AAL environment 102, and/or a cloud-based service. A network can be implemented to include a wired and/or wireless network, may be implemented using any type of network topology and/or communication protocol, and can be represented or otherwise implemented as a combination of two or more networks, to include cellular networks, IP-based networks, and/or the Internet. The network may also include mobile operator networks that are managed by a network provider of a cellular network, a mobile network operator, and/or other network operators, such as a communication service provider, mobile phone provider, and/or Internet service provider.

In aspects of navigation tracking in an always aware location environment with mobile localization nodes, the positioning module 134 of the mobile localization node 108 can receive the x,y-coordinate data 210 corresponding to the mobile localization node from the server computing device 126, which has located the mobile localization node 108 as one of the located nodes 130 in the AAL environment 102. The mobile localization node 108 can receive the coordinate data 210 as one or two initial coordinates of the mobile localization node 108 at a current location in the AAL environment. For example, the mobile localization node 108 may receive the location coordinate data as an x-coordinate or as x,y-coordinates corresponding to the location of the mobile localization node in the AAL environment.

The positioning module 134 of the mobile localization node 108 can then determine (or has previously determined) one or more additional coordinates of the mobile localization node in the AAL environment 102, such as from the inertial measurement unit 206 of the mobile localization node. For example, the positioning module 134 can determine y,z-coordinate data or z-elevation data 212 that corresponds to the item 110, which is located in the AAL environment 102 on the top shelf of the shelving unit. The positioning module 134 of the mobile localization node 108 can then correlate the one or two initial coordinates (e.g., the x-coordinate or the x,y-coordinates) received from the server computing device 126 with the one or more additional coordinates (e.g., the z-elevation data 212) determined by the positioning module for the mobile localization node, such as based on a common timestamp for the x,y,z-coordinates.

The positioning module 134 of the mobile localization node 108 can designate a device origin 214 of the mobile localization node 108 within the AAL environment 102 based on a combination of the correlated coordinates (e.g., the x,y,z-coordinates that have been correlated) and that correspond to the location of the mobile localization node in the environment. The device origin 214 can be set at (0,0,0), or any other coordinates relative to the location or position of the mobile localization node 108 in the AAL environment 102. Initially, the sensors of the inertial measurement unit 206 do not have a frame of reference to know where the mobile localization node is located in the environment. However, the correlation of the x,y,z-coordinates provides a dead-reckoning from which to track the navigation of the mobile localization node 108 in the AAL environment 102 based on the rotational vectors from the inertial measurement unit sensors. The positioning module 134 can determine a delta z from the device origin 214 as the z-elevation data 212 that corresponds to the item 110 located in the AAL environment 102.

The positioning module 134 is implemented to then self-track navigation of the mobile localization node 108 in the AAL environment 102 in three dimensions based on updates to the correlated coordinates (e.g., the x,y,z-coordinates 120) as the mobile localization node moves (or is moved with the item 110) from the device origin 214 to subsequent locations within the environment. For example, a person may move the item 110 from the top shelf of the shelving unit down in a direction of −z elevation to the floor at a different location 136 of the building room, such as shown at 138. The positioning module 134 generates and updates the navigation data 216 as the positioning module self-tracks the navigation of the mobile localization node 108 within the AAL environment 102. Notably, the self-tracking navigation of the mobile localization node 108 by the positioning module 134 is implemented without communication to the server computing device 126, and without receiving updated coordinate data 132 from the server computing device 126. In implementations, this saves device power that would otherwise be utilized for the ongoing device updates to and from the location module 128 of the server computing device 126.

Alternatively or in addition, the positioning module 134 of the mobile localization node 108 may also receive updated coordinate data 132 from the server computing device 126 as the mobile localization node moves within the AAL environment 102. The positioning module 134 can utilize the received, updated x,y-coordinate data 132, as well as determine updated z-coordinates of the mobile localization node 108 as the mobile localization node moves (or is moved with the item 110) within the AAL environment 102. The positioning module 134 can then track the navigation of the mobile localization node 108 in three dimensions in the AAL environment 102 based on the updated x,y,z-coordinates that are correlated by a common timestamp.

In implementations, the positioning module 134 of the mobile localization node 108 may receive a request from the server computing device 126 for an update as to the current position of the mobile localization node in the AAL environment 102. The mobile localization node 108 can then communicate the navigation data 216 as its current position in the AAL environment 102 back to the server computing device 126, where the navigation data 216 indicates the current x,y,z-coordinates corresponding to the mobile localization node 108 as tracked by the positioning module 134. The positioning module 134 of the mobile localization node 108 may also receive, from the server computing device 126, indications of distances from the current location of the mobile localization node to boundaries 122 of the AAL environment 102. The positioning module 134 can then determine when a subsequent location of the mobile localization node 108 corresponds to a boundary 122 of the AAL environment based on the self-tracking of the mobile localization node. In an event that the mobile localization node 108 exits the boundaries of the environment, the relative device origin 214 can be released, restoring mobile localization node positioning based on conventional positioning and/or tracking systems.

Figure 3:
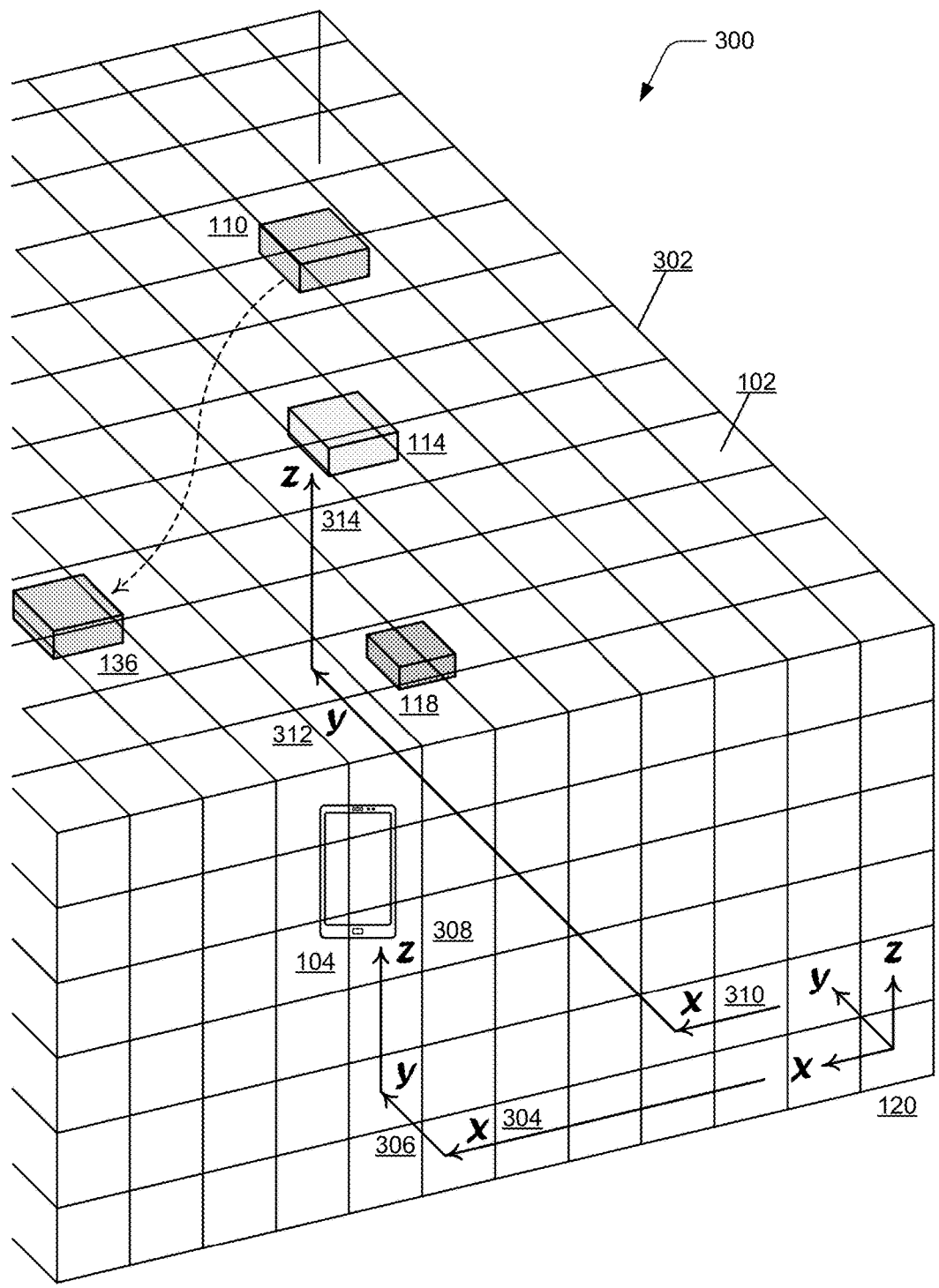
FIG. 3 illustrates an example three-dimensional (3D) mesh that is generated to visually represent mobile sensors and devices in the example environment in which aspects of navigation tracking in an always aware location environment with mobile localization nodes can be implemented.

FIG. 3 illustrates an example 300 of a three-dimensional (3D) mesh 302 that the positioning module 134 implemented by the mobile localization node 108 can generate of the AAL environment 102 to visually represent the location and/or subsequent locations of the mobile localization node 108 in the AAL environment 102, in aspects of navigation tracking in an always aware location environment with mobile localization nodes. For example, the 3D mesh 302 visually represents the location of the mobile phone 104, as well as the items 110, 114, and 118 that are located on the shelving unit in the AAL environment 102. The 3D mesh 302 may also be generated to illustrate the x,y,z-coordinates 120 corresponding to each of the mobile localization nodes, which are associated with each of the items and the mobile phone 104, in the AAL environment 102. For example, the mobile phone 104 is shown located at a three-dimensional position in the AAL environment as indicated by the x-coordinate 304, the y-coordinate 306, and the z-coordinate 308. Similarly, the item 114 is shown located at a three-dimensional position in the AAL environment as indicated by the x-coordinate 310, the y-coordinate 312, and the z-coordinate 314. The 3D mesh 302 also illustrates the movement of the item 110 from it's initial origin position in the AAL environment 102 down to the location 136 (e.g., a direction of −z elevation in the environment).

Returning to the discussion of FIGS. 1 and 2, the mobile device 106, such as the example mobile phone 104, includes a mobile localization node 140 with an implementation of a positioning module 142 that implements aspects of navigation tracking in an always aware location environment with mobile localization nodes. With reference to FIG. 2, the positioning module 142 of the mobile localization node 140 may include independent processing, memory, and logic components functioning as a computing and/or electronic device integrated with the mobile localization node 140. Alternatively or in addition, the positioning module 142 can be implemented as a software application or software module, such as computer-executable software instructions that are executable with a processor or processing system 218 of the mobile device 106. As a software application, the positioning module 142 can be stored on computer-readable storage memory (e.g., device memory 220), or with any suitable memory device or electronic data storage implemented with the mobile device 108.

In this example, the mobile device 106 includes an inertial measurement unit 222, which may include various sensors, such as a gyroscope, an accelerometer, and/or other types of motion sensors to sense motion and movement of the mobile localization node 140. The various sensors of the inertial measurement unit 222 generate sensor data vectors having three-dimensional parameters (e.g., rotational vectors in x, y, and z coordinates) indicating position, location, and/or orientation of the mobile device 106. As described with reference to the positioning module 134 of the mobile localization node 108, the positioning module 142 of the mobile localization node 140 is implemented to self-track the navigation of the mobile localization node 140 (and the navigation of the mobile device 106) within the AAL environment 102 based on data received from the inertial measurement unit 222 of the mobile localization node. The data received from the inertial measurement unit can be in the form of rotational vector data in three dimensions from the sensors of the inertial measurement unit 222. In implementations, the coordinate tracking data received from the inertial measurement unit 222 can be augmented by accelerometer data, such as to infer z-elevation data, and may be augmented with orientation data in the form of pitch, yaw, and/or roll. Other sensor and location data may be received from a barometer sensor, a camera, and other sensors from which dimension, rotation, navigation, and location coordinates can be determined.

The mobile device 106 can also include one or more different wireless radio systems 224, such as for Wi-Fi, Bluetooth™, Mobile Broadband, LTE, Near Field Communication (NFC), Real-time Locating System (RTLS), or any other wireless radio system or format for communication via respective wireless networks. Generally, the mobile device 106 implements the wireless radio systems 224 that each include a radio device, antenna, and chipset implemented for cellular, wireless, and/or other network communication with other devices, networks, and services. A wireless radio system 224 can be configured to implement any suitable communication protocol or standard for communication via any type of communication and data network (or combination of networks).

In aspects of navigation tracking in an always aware location environment with mobile localization nodes, the positioning module 142 of the mobile localization node 140 can receive the x,y-coordinate data 226 corresponding to the mobile localization node from the server computing device 126, which has located the mobile device 106 as one of the located nodes 130 in the AAL environment 102. The mobile localization node 140 can receive the coordinate data 226 as one or two initial coordinates of the mobile localization node 140 at a current location in the AAL environment. For example, the mobile localization node 140 may receive the location coordinate data as an x-coordinate or as x,y-coordinates corresponding to the location of the mobile localization node in the AAL environment.

The positioning module 142 of the mobile localization node 140 can then determine (or has previously determined) one or more additional coordinates of the mobile localization node in the AAL environment 102, such as from the inertial measurement unit 222 of the mobile device. For example, the positioning module 142 can determine y,z-coordinate data or z-elevation data 228 that corresponds to the mobile device 106, which is located in the AAL environment 102. The positioning module 142 of the mobile localization node 140 can then correlate the one or two initial coordinates (e.g., the x-coordinate or the x,y-coordinates) received from the server computing device 126 with the one or more additional coordinates (e.g., the z-elevation data 228) determined by the positioning module for the mobile localization node, such as based on a common timestamp for the x,y,z-coordinates.

The positioning module 142 of the mobile localization node 140 can designate a device origin 230 of the mobile device 106 within the AAL environment 102 based on a combination of the correlated coordinates (e.g., the x,y,z-coordinates that have been correlated) and that correspond to the location of the mobile device in the environment. The positioning module 142 is implemented to then self-track navigation of the mobile localization node 108 that is associated with the mobile device 106 in the AAL environment 102 in three dimensions based on updates to the correlated coordinates (e.g., the x,y,z-coordinates 120) as the mobile localization node moves (or is moved with the mobile device 106) from the device origin 230 to subsequent locations within the environment. For example, a person may carry the mobile device 106 around with them in the building environment that is the AAL environment 102. The positioning module 142 generates and updates the navigation data 232 as the positioning module self-tracks the navigation of the mobile localization node 140 that is associated with the mobile device 106 within the AAL environment 102. Notably, the self-tracking navigation of the mobile localization node 140 by the positioning module 142 is implemented without communication to the server computing device 126, and without receiving updated coordinate data 132 from the server computing device 126. As noted above, this saves device power that would otherwise be utilized for the ongoing device updates to and from the location module 128 of the server computing device 126.

Alternatively or in addition, the positioning module 142 of the mobile localization node 140 may also receive updated coordinate data 132 from the server computing device 126 as the mobile localization node moves within the AAL environment 102. The positioning module 142 can utilize the received, updated x,y-coordinate data 132, as well as determine updated z-coordinates of the mobile localization node 140 as the mobile localization node moves with the associated mobile device 106 within the AAL environment 102. The positioning module 142 can then track the navigation of the mobile localization node 140 in three dimensions in the AAL environment 102 based on the updated x,y,z-coordinates that are correlated by a common timestamp.

In implementations, the positioning module 142 of the mobile localization node 140 may receive a request from the server computing device 126 for an update as to the current position of the mobile device 106 in the AAL environment 102. The mobile device 106 can then communicate the navigation data 232 from the positioning module 142 as its current position in the AAL environment 102 back to the server computing device 126, where the navigation data 232 indicates the current x,y,z-coordinates corresponding to the mobile device 106 as tracked by the positioning module 142 of the mobile localization node 140. The positioning module 142 of the mobile localization node 140 may also receive, from the server computing device 126, indications of distances from the current location of the mobile device 106 to boundaries 122 of the AAL environment 102. The positioning module 142 can then determine when a subsequent location of the mobile device 106 corresponds to a boundary 122 of the AAL environment based on the self-tracking of the mobile localization node. In an event that the mobile device 106 exits the boundaries of the environment, the relative device origin 230 can be released, restoring device positioning based on conventional positioning and/or tracking systems.

Similar to the positioning module 134 of the mobile localization node 108, the positioning module 142 of the mobile localization node 140 in the mobile device 106 can generate the example three-dimensional (3D) mesh 302 of the AAL environment 102 to visually represent the location and/or subsequent locations of the mobile device 106 in the AAL environment 102. The generated 3D mesh can then be displayed to a user on a display device of the mobile device 106 for a synchronized 3D view of the mobile device 106 in the environment of the AAL environment 102.

Example method 400 is described with reference to FIG. 4 in accordance with implementations of navigation tracking in an always aware location environment with mobile localization nodes. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

FIG. 4 illustrates example method(s) 400 of navigation tracking in an always aware location environment with mobile localization nodes as described herein, and the method is generally described with reference to a positioning module implemented in a mobile localization node. The order in which the method is described is not intended to be construed as a limitation, and any number or combination of the described method operations can be performed in any order to perform a method, or an alternate method.

At 402, at least one initial coordinate is received from a server computing device that implements a location module to locate wireless communication devices in an always aware location (AAL) environment. For example, the location module 128 that is implemented by the server computing device 126 locates the mobile localization node 108 and the mobile device 106 by the corresponding mobile localization node 140 in the AAL environment 102, which can be designated in the two dimensions as x,y-coordinates. The positioning module 134 that is implemented by the mobile localization node 108 receives the coordinate data 132 (e.g., as x-coordinate data or x,y-coordinate data) corresponding to the mobile localization node from the server computing device 126 to locate the mobile localization node 108 in the AAL environment 102. Similarly, the positioning module 142 of the mobile localization node 140 that is implemented in the mobile device 106 receives the coordinate data 132 corresponding to the mobile device from the server computing device 126 to locate the mobile localization node 140 associated with the mobile device 106 in the AAL environment 102.

At 404, one or more additional coordinates of a mobile localization node in the AAL environment is determined. For example, the positioning module 134 that is implemented by the mobile localization node 108 determines one or more additional coordinates (e.g., y,z-coordinates or a z-coordinate) of the mobile localization node in the AAL environment 102, such as from the inertial measurement unit 206 of the mobile localization node 108. Similarly, the positioning module 142 of the mobile localization node 140 that is implemented in the mobile device 106 determines one or more additional coordinates of the mobile device in the AAL environment 102, such as from the inertial measurement unit 222 of the mobile device.

At 406, the at least one initial coordinate received from the server computing device is correlated with the one or more additional coordinates determined by the positioning module based on a common timestamp for the initial and additional coordinates. For example, the positioning module 134 that is implemented by the mobile localization node 108 correlates the initial coordinates received from the server computing device 126 with the additional coordinates determined by the positioning module 134 for the mobile localization node. Similarly, the positioning module 142 of the mobile localization node 140 that is implemented in the mobile device 106 correlates the initial coordinates received from the server computing device 126 with the additional coordinates determined by the positioning module 142 for the mobile device.

At 408, an origin of the mobile localization node within the AAL environment is designated based on a combination of the correlated coordinates. For example, the positioning module 134 that is implemented by the mobile localization node 108 designates the origin of the mobile localization node within the AAL environment 102 based on the combination of the correlated coordinates that correspond to the mobile localization node. In the example implementation, this device origin 214 corresponds to the location of the item 110 in the AAL environment 102. Similarly, the positioning module 142 of the mobile localization node 140 that is implemented in the mobile device 106 designates the origin of the mobile device within the AAL environment 102 based on the combination of the correlated coordinates that correspond to the mobile device.

At 410, navigation of the mobile localization node is self-tracked in three dimensions based on updates to the correlated coordinates as the mobile localization node moves from the origin to subsequent locations within the AAL environment. For example, the positioning module 134 that is implemented by the mobile localization node 108 self-tracks navigation of the mobile localization node in the AAL environment 102 in three dimensions based on updates to the correlated coordinates as the mobile localization node moves (or is moved) from the device origin 214 to subsequent locations within the environment. This self-tracking the navigation of the mobile localization node 108 within the AAL environment 102 by the positioning module 134 of the mobile localization node is without receiving updated coordinate data 132 from the server computing device 126. Similarly, the positioning module 142 of the mobile localization node 140 that is implemented in the mobile device 106 self-tracks navigation of the mobile device in the AAL environment 102 in three dimensions based on updates to the correlated coordinates as the mobile device moves (or is moved) from the device origin 230 to subsequent locations within the environment. This tracking the navigation of the mobile device 106 within the AAL environment 102 by the positioning module 142 of the mobile localization node 140 in the mobile device is without receiving updated coordinate data 132 from the server computing device 126.

In implementations, the positioning module 134 that is implemented by the mobile localization node 108 receives updated coordinate data 132 from the server computing device 126 as the mobile localization node moves within the AAL environment 102 (similar in aspect to 402). The positioning module 134 of the mobile localization node 108 also determines updated additional coordinates (e.g., the z-elevation data 212) for the mobile localization node as the mobile localization node moves (or is moved) within the AAL environment 102 (similar in aspect to 404). The positioning module 134 also tracks the navigation of the mobile localization node 108 in the three dimensions in the AAL environment 102 based on the updated coordinates that are correlated by a common timestamp (similar in aspect to 406 and 410).

Similarly, the positioning module 142 of the mobile localization node 140 that is implemented in the mobile device 106 receives updated coordinate data 132 from the server computing device 126 as the mobile device moves within the AAL environment 102 (similar in aspect to 402). The positioning module 142 of the mobile localization node 140 in the mobile device 106 also determines updated additional coordinates (e.g., the z-elevation data 228) for the mobile device as the mobile device moves (or is moved) within the AAL environment 102 (similar in aspect to 404). The positioning module 142 also tracks the navigation of the mobile device 106 in the three dimensions in the AAL environment 102 based on the updated coordinates that are correlated by a common timestamp (similar in aspect to 406 and 410).

At 412, a request is received from the server computing device for a current position of the mobile localization node, and at 414, the current position of the mobile localization node is communicated based on current location coordinates of the mobile localization node in the AAL environment. For example, the positioning module 134 that is implemented by the mobile localization node 108 receives a request from the server computing device 126 for the current position of the mobile localization node in the AAL environment 102, and the mobile localization node 108 communicates the navigation data 216 as its current position in the AAL environment 102 back to the server computing device 126 based on the current location coordinates corresponding to the mobile localization node 108, as tracked by the positioning module 134. Similarly, the positioning module 142 of the mobile localization node 140 that is implemented in the mobile device 106 receives a request from the server computing device 126 for the current position of the mobile device in the AAL environment 102, and the mobile device communicates the navigation data 232 from the positioning module 142 as its current position in the AAL environment 102 back to the server computing device 126 based on the current location coordinates corresponding to the mobile device, as tracked by the positioning module 142.

At 416, a three-dimensional (3D) mesh is generated that visually represents one or more of the subsequent locations of the mobile localization node in the AAL environment. For example, the positioning module 134 that is implemented by the mobile localization node 108 generates the example three-dimensional (3D) mesh 302 that visually represents the location and/or subsequent locations of the mobile localization node in the AAL environment 102. Similarly, the positioning module 142 of the mobile localization node 140 that is implemented in the mobile device 106 generates the example three-dimensional (3D) mesh 302 that visually represents the location and/or subsequent locations of the mobile device in the AAL environment 102, and the generated 3D mesh can be displayed to a user on a display device of the mobile device.

Figure 5:
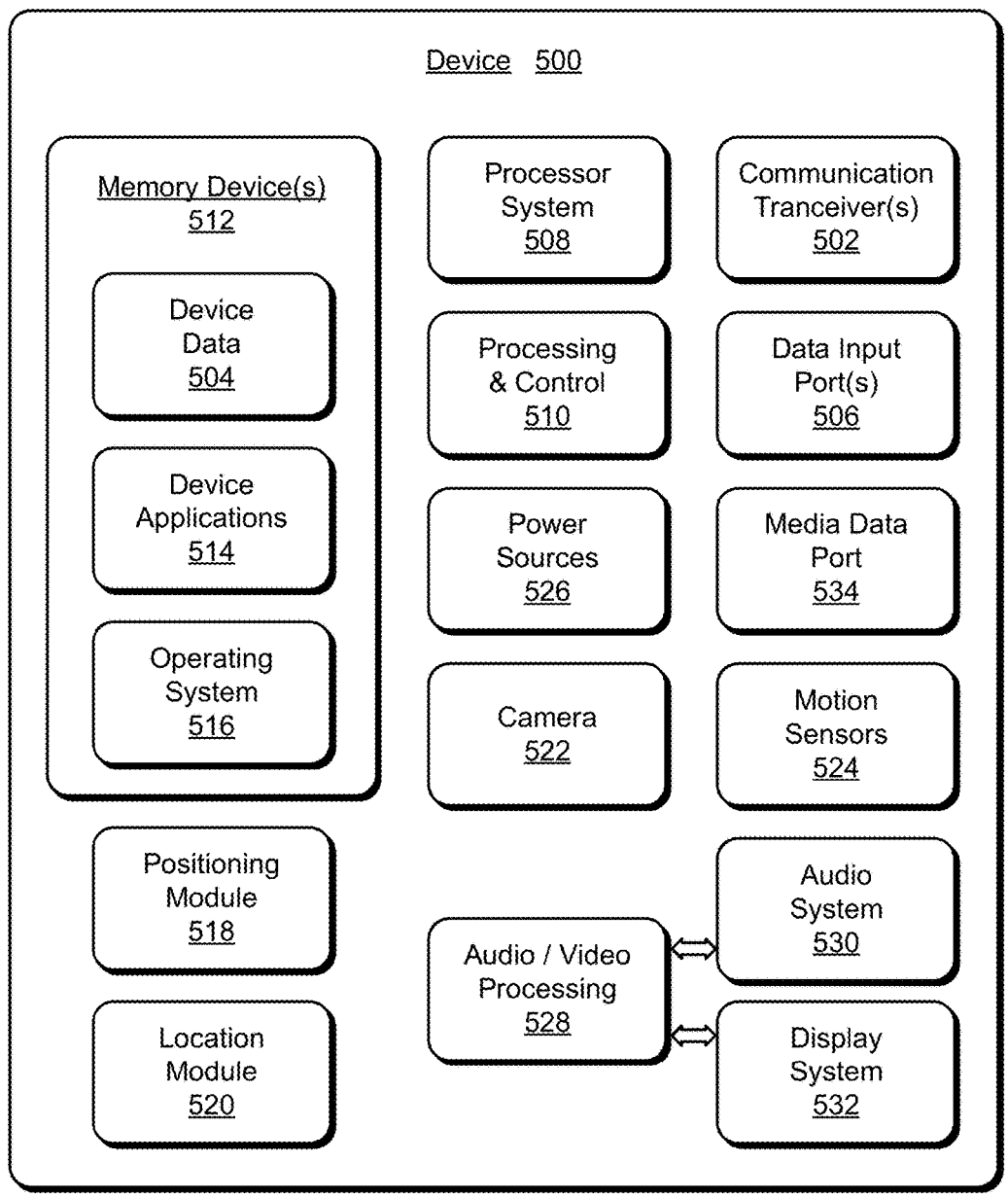
FIG. 5 illustrates various components of an example device that can implement aspects of navigation tracking in an always aware location environment with mobile localization nodes.

FIG. 5 illustrates various components of an example device 500 in which aspects of navigation tracking in an always aware location environment with mobile localization nodes can be implemented. The example device 500 can be implemented as any of the devices described with reference to the previous FIGS. 1-4, such as any type of mobile device, mobile localization node, mobile phone, client device, wearable device, tablet, computing, communication, entertainment, gaming, media playback, and/or other type of electronic device. For example, the server computing device 126, the mobile device 106, and each of the mobile localization nodes 108, 140 shown and described with reference to FIGS. 1-4 may be implemented as the example device 500. Further a wearable device may include any one or combination of a watch, armband, wristband, bracelet, glove or pair of gloves, glasses, jewelry items, clothing items, any type of footwear or headwear, and/or other types of wearable articles.

The device 500 includes communication transceivers 502 that enable wired and/or wireless communication of device data 504 with other devices. The device data 504 can include any of the coordinate data, navigation data, and device location data. Additionally, the device data 504 can include any type of audio, video, and/or image data. Example communication transceivers 502 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processing system 508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory 512 (e.g., memory devices) that enable data storage, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory 512 provides data storage mechanisms to store the device data 504, other types of information and/or data, and various device applications 514 (e.g., software applications). For example, an operating system 516 can be maintained as software instructions with a memory device and executed by the processing system 508. The device applications may also include a device manager, such as any form of a control application, software application, signal-processing and control module, code that is native to a particular device, a hardware abstraction layer for a particular device, and so on.

In this example, the device 500 includes a positioning module 518 that implements aspects of navigation tracking in an always aware location environment with mobile localization nodes, and may be implemented with hardware components and/or in software as one of the device applications 514, such as when the device 500 is implemented as the mobile localization node 108 or as the mobile localization node 140 of the mobile device 106 shown and described with reference to FIGS. 1-4. Examples of the positioning module 518 are the positioning module 134 that is implemented as a software application and/or as hardware components of the mobile localization node 108, and the positioning module 142 that is implemented as a software application and/or as hardware components of the mobile localization node 140 in the mobile device 106. In implementations, the positioning module 518 may include independent processing, memory, and logic components as a computing and/or electronic device integrated with the device 500.

The device 500 also includes a location module 520 that implements aspects of navigation tracking in an always aware location environment with mobile localization nodes, and may be implemented with hardware components and/or in software as one of the device applications 514, such as when the device 500 is implemented as the server computing device 126 shown and described with reference to FIGS. 1-4. An example of the location module 520 is the location module 128 that is implemented as a software application and/or as hardware components in the server computing device 126. In implementations, the location module 520 may include independent processing, memory, and logic components as a computing and/or electronic device integrated with the device 500.

In this example, the device 500 also includes a camera 522 and motion sensors 524, such as may be implemented in an inertial measurement unit (IMU). The motion sensors 524 can be implemented with various sensors, such as a gyroscope, an accelerometer, and/or other types of motion sensors to sense motion of the device. The various motion sensors 524 may also be implemented as components of an inertial measurement unit in the device. The example device 500 can also include one or more power sources 526, such as when the device is implemented as a mobile device. The power sources may include a charging and/or power system, and can be implemented as a flexible strip battery, a rechargeable battery, a charged super-capacitor, and/or any other type of active or passive power source.

The example device 500 also includes an audio and/or video processing system 528 that generates audio data for an audio system 530 and/or generates display data for a display system 532. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 534. In implementations, the audio system and/or the display system are integrated components of the example device. Alternatively, the audio system and/or the display system are external, peripheral components to the example device.

Although aspects of navigation tracking in an always aware location environment with mobile localization nodes have been described in language specific to features and/or methods, the subject of the appended claims is not necessarily limited to the specific features or methods described. Rather, the specific features and methods are disclosed as example implementations of navigation tracking in an always aware location environment with mobile localization nodes, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following embodiments.

A positioning system, comprising: a server computing device that implements a location module to locate wireless communication devices in an always aware location (AAL) environment; a mobile localization node located within the AAL environment, the mobile localization node implements a positioning module to: receive, from the server computing device, one or two initial coordinates of the mobile localization node at a current location in the AAL environment; determine one or more additional coordinates of the mobile localization node at the current location in the AAL environment; designate the current location as an origin of the mobile localization node based on a combination of the initial and additional coordinates; and self-track navigation of the mobile localization node within the AAL environment as the mobile localization node moves from the origin to subsequent locations.

Alternatively or in addition to the above described positioning system, any one or combination of: the positioning module of the mobile localization node is implemented to self-track the navigation of the mobile localization node within the AAL environment without receiving updated coordinates from the server computing device. The positioning module of the mobile localization node is implemented to determine the one or more additional coordinates of the mobile localization node from an inertial measurement unit of the mobile localization node. The positioning module of the mobile localization node is implemented to: receive the initial coordinates as x,y-coordinates of the mobile localization node at the current location in the AAL environment; determine the additional coordinate as a z-coordinate of the mobile localization node at the current location in the AAL environment; and designate the origin of the mobile localization node at the x,y,z-coordinates. The positioning module of the mobile localization node is implemented to self-track the navigation of the mobile localization node within the AAL environment from the origin based on data received from an inertial measurement unit of the mobile localization node. The positioning module of the mobile localization node is implemented to: receive a request from the server computing device for a current position of the mobile localization node; and communicate the current position of the mobile localization node based on current location coordinates of the mobile localization node in the AAL environment. The mobile localization node is a wireless tag associated with an object in the AAL environment; and the positioning module of the mobile localization node is implemented to designate a subsequent location of the object in a z-elevation at an x,y-location in the AAL environment. The positioning module of the mobile localization node is implemented to generate a three-dimensional (3D) mesh that visually represents one or more of the subsequent locations of the mobile localization node in the AAL environment. The AAL environment is a geo-fenced area; the positioning module of the mobile localization node is implemented to: receive, from the server computing device, indications of distances from the current location of the mobile localization node to boundaries of the geo-fenced area; and determine when a subsequent location of the mobile localization node corresponds to a boundary of the geo-fenced area based on the self-tracking of the mobile localization node.

A mobile localization node, comprising: a communication interface to receive at least one initial coordinate from a server computing device that implements a location module to locate wireless communication devices in an always aware location (AAL) environment; a processor to implement a positioning module to: determine one or more additional coordinates of the mobile localization node in the AAL environment; correlate the at least one initial coordinate received from the server computing device with the one or more additional coordinates determined by the positioning module based on a common timestamp for the initial and additional coordinates; designate an origin of the mobile localization node within the AAL environment based on a combination of the correlated coordinates; and self-track navigation of the mobile localization node in three dimensions based on updates to the correlated coordinates as the mobile localization node moves from the origin to subsequent locations within the AAL environment.

Alternatively or in addition to the above described mobile localization node, any one or combination of: the positioning module is implemented to self-track the navigation of the mobile localization node within the AAL environment without receiving updated coordinates from the server computing device. The mobile localization node further comprising an inertial measurement unit from which the positioning module is implemented to determine the one or more additional coordinates of the mobile localization node. The communication interface is implemented to receive a request for a current position of the mobile localization node; and the positioning module is implemented to provide the current position of the mobile localization node based on current location coordinates of the mobile localization node in the AAL environment. The mobile localization node is a wireless tag associated with an object in the AAL environment; and the positioning module of the mobile localization node is implemented to designate a subsequent location of the object in a z-elevation at an x,y-location in the AAL environment. The positioning module of the mobile localization node is implemented to generate a three-dimensional (3D) mesh that visually represents one or more of the subsequent locations of the mobile localization node in the AAL environment.

A method, comprising: receiving at least one initial coordinate from a server computing device that implements a location module to locate wireless communication devices in an always aware location (AAL) environment; determining one or more additional coordinates of a mobile localization node in the AAL environment; correlating the at least one initial coordinate received from the server computing device with the one or more additional coordinates based on a common timestamp for the initial and additional coordinates; designating an origin of the mobile localization node within the AAL environment based on a combination of the correlated coordinates; and self-tracking, by the mobile localization node, navigation of the mobile localization node in three dimensions based on updates to the correlated coordinates as the mobile localization node moves from the origin to subsequent locations within the AAL environment.

Alternatively or in addition to the above described method, any one or combination of: receiving updated location coordinates as the mobile localization node moves within the AAL environment; determining updated additional coordinates of the mobile localization node as the mobile localization node moves within the AAL environment; and the self-tracking the navigation of the mobile localization node in the three dimensions based on the updated coordinates that are correlated by the common timestamp. The self-tracking the navigation of the mobile localization node within the AAL environment is without receiving updated coordinates from the server computing device. The method further comprising: receiving a request from the server computing device for a current position of the mobile localization node; and communicating the current position of the mobile localization node based on current location coordinates of the mobile localization node in the AAL environment. The method further comprising generating a three-dimensional (3D) mesh that visually represents one or more of the subsequent locations of the mobile localization node in the AAL environment.

The invention claimed is:

1. A positioning system, comprising:
    a server computing device that implements a location module to locate wireless communication devices in an always aware location (AAL) environment;
    a mobile localization node located within the AAL environment, the mobile localization node including a memory and a processor that implements, at least partially in hardware, a positioning module to:
        receive, from the server computing device, one or two initial coordinates of the mobile localization node at a current location in the AAL environment;
        determine one or more additional coordinates of the mobile localization node at the current location in the AAL environment;
        designate the current location as an origin of the mobile localization node based on a combination of the initial and additional coordinates; and
        self-track navigation of the mobile localization node within the AAL environment as the mobile localization node moves from the origin to subsequent locations, the self-track navigation based on navigation data generated by the mobile localization node, and the self-track navigation performed without receiving updated coordinates from the server computing device.

2. The positioning system as recited in claim 1, wherein the positioning module of the mobile localization node is implemented to receive the navigation data from an inertial measurement unit of the mobile localization node to self-track the navigation of the mobile localization node within the AAL environment.

3. The positioning system as recited in claim 1, wherein the positioning module of the mobile localization node is implemented to determine the one or more additional coordinates of the mobile localization node from an inertial measurement unit of the mobile localization node.

4. The positioning system as recited in claim 1, wherein the positioning module of the mobile localization node is implemented to:
    receive the initial coordinates as x,y-coordinates of the mobile localization node at the current location in the AAL environment;
    determine the additional coordinate as a z-coordinate of the mobile localization node at the current location in the AAL environment; and
    designate the origin of the mobile localization node at the x,y,z-coordinates.

5. The positioning system as recited in claim 1, wherein the positioning module of the mobile localization node is implemented to self-track the navigation of the mobile localization node within the AAL environment from the origin based on the navigation data received from an inertial measurement unit of the mobile localization node.

6. The positioning system as recited in claim 1, wherein the positioning module of the mobile localization node is implemented to:
    receive a request from the server computing device for a current position of the mobile localization node; and
    communicate the current position of the mobile localization node based on current location coordinates of the mobile localization node in the AAL environment.

7. The positioning system as recited in claim 1, wherein:
    the mobile localization node is a wireless tag associated with an object in the AAL environment; and
    the positioning module of the mobile localization node is implemented to designate a subsequent location of the object in a z-elevation at an x,y-location in the AAL environment.

8. The positioning system as recited in claim 1, wherein the positioning module of the mobile localization node is implemented to generate a three-dimensional (3D) mesh that visually represents one or more of the subsequent locations of the mobile localization node in the AAL environment.

9. The positioning system as recited in claim 1, wherein:
    the AAL environment is a geo-fenced area;
    the positioning module of the mobile localization node is implemented to:
    receive, from the server computing device, indications of distances from the current location of the mobile localization node to boundaries of the geo fenced area; and
    determine when a subsequent location of the mobile localization node corresponds to a boundary of the geo-fenced area based on the self-tracking of the mobile localization node.

10. A mobile localization node, comprising:
    a communication interface to receive at least one initial coordinate from a server computing device that implements a location module to locate wireless communication devices in an always aware location (AAL) environment;
    a processor to implement, at least partially in hardware, a positioning module to:
    determine one or more additional coordinates of the mobile localization node in the AAL environment;
    correlate the at least one initial coordinate received from the server computing device with the one or more additional coordinates determined by the positioning module based on a common timestamp for the initial and additional coordinates;
    designate an origin of the mobile localization node within the AAL environment based on a combination of the correlated coordinates; and
    self-track navigation of the mobile localization node in three dimensions based on updates to the correlated coordinates as the mobile localization node moves from the origin to subsequent locations within the AAL environment, the updates to the correlated coordinates determined from navigation data generated by an inertial measurement unit of the mobile localization node.

11. The mobile localization node as recited in claim 10, wherein the positioning module is implemented to self-track the navigation of the mobile localization node within the AAL environment without receiving updated coordinates from the server computing device.

12. The mobile localization node as recited in claim 10, further comprising the inertial measurement unit from which the positioning module is implemented to determine the one or more additional coordinates of the mobile localization node.

13. The mobile localization node as recited in claim 10, wherein:
the communication interface is implemented to receive a request for a current position of the mobile localization node; and
the positioning module is implemented to provide the current position of the mobile localization node based on current location coordinates of the mobile localization node in the AAL environment.

14. The mobile localization node as recited in claim 10, wherein:
the mobile localization node is a wireless tag associated with an object in the AAL environment; and
the positioning module of the mobile localization node is implemented to designate a subsequent location of the object in a z-elevation at an x,y-location in the AAL environment.

15. The mobile localization node as recited in claim 10, wherein the positioning module of the mobile localization node is implemented to generate a three dimensional (3D) mesh that visually represents one or more of the subsequent locations of the mobile localization node in the AAL environment.

16. A method, comprising:
executing a positioning module on a processor of a mobile localization node implemented as a computing device, the positioning module performing:
receiving at least one initial coordinate from a server computing device that implements a location module to locate wireless communication devices in an always aware location (AAL) environment;
determining one or more additional coordinates of a mobile localization node in the AAL environment;
correlating the at least one initial coordinate received from the server computing device with the one or more additional coordinates based on a common timestamp for the initial and additional coordinates;
designating an origin of the mobile localization node within the AAL environment based on a combination of the correlated coordinates; and
self-tracking, by the mobile localization node, navigation of the mobile localization node in three dimensions based on updates to the correlated coordinates as the mobile localization node moves from the origin to subsequent locations within the AAL environment, the updates to the correlated coordinates determined from navigation data generated by an inertial measurement unit of the mobile localization node.

17. The method as recited in claim 16, further comprising:
receiving updated location coordinates as the mobile localization node moves within the AAL environment;
determining updated additional coordinates of the mobile localization node as the mobile localization node moves within the AAL environment; and
the self-tracking the navigation of the mobile localization node in the three dimensions based on the updated coordinates that are correlated by the common timestamp.

18. The method as recited in claim 16, wherein the self-tracking the navigation of the mobile localization node within the AAL environment is without receiving updated coordinates from the server computing device.

19. The method as recited in claim 16, further comprising:
receiving a request from the server computing device for a current position of the mobile localization node; and
communicating the current position of the mobile localization node based on current location coordinates of the mobile localization node in the AAL environment.

20. The method as recited in claim 16, further comprising generating a three-dimensional (3D) mesh that visually represents one or more of the subsequent locations of the mobile localization node in the AAL environment.

* * * * *